UNITED STATES PATENT OFFICE.

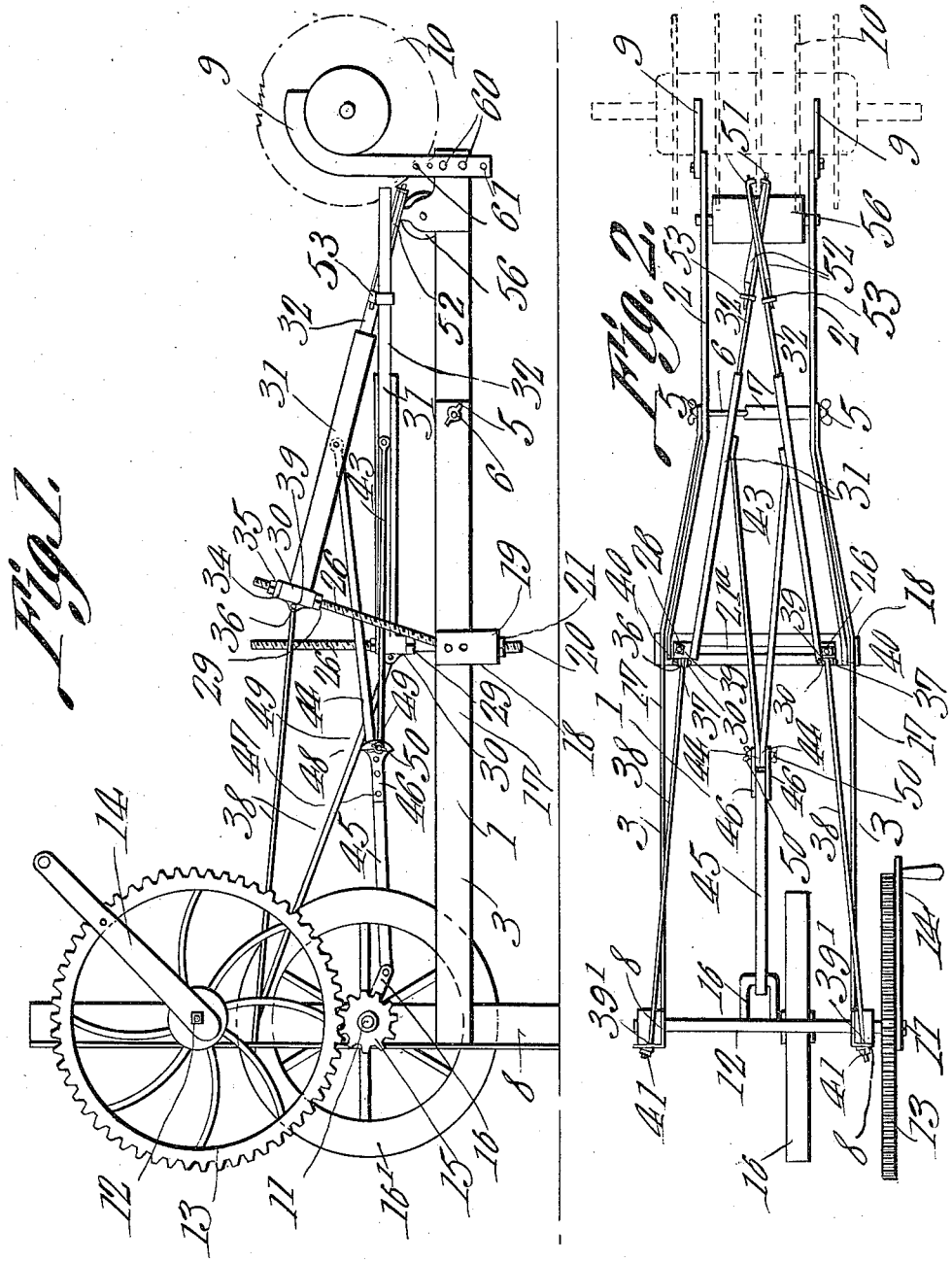

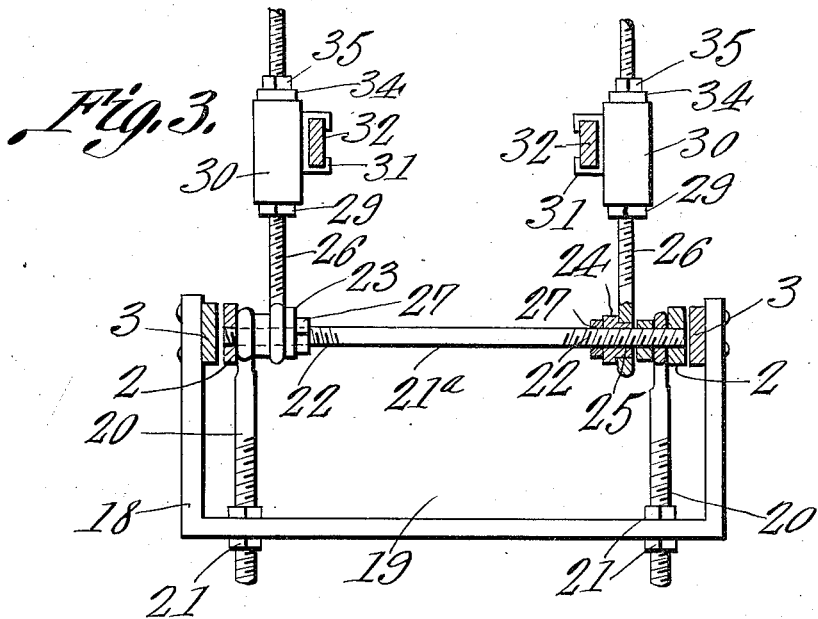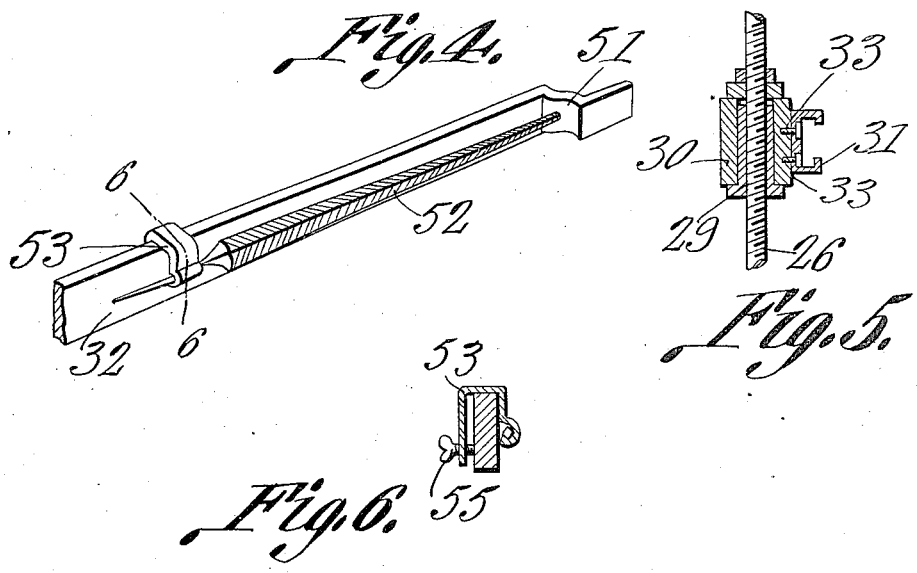

JAMES HENRY WESSON, OF ATALLA, ALABAMA.

GIN-SAW FILE.

1,041,211. Specification of Letters Patent. Patented Oct. 15, 1912.

Application filed October 6, 1910. Serial No. 585,661.

*To all whom it may concern:*

Be it known that I, JAMES HENRY WESSON, a citizen of the United States, residing at Atalla, in the county of Etowah and State of Alabama, have invented a new and useful Gin-Saw File, of which the following is a specification.

This invention relates to a new and useful apparatus, so constructed and operated as to sharpen the teeth of gin saws, and the fundamental object of the invention is to provide a device in which novel characteristics and features are involved.

Another object of the invention is to provide means for imparting a reciprocating motion to the sharpening files, whereby the teeth of the saws may be thoroughly sharpened.

A further feature of the invention is to provide carriers for the file-holding bars, which carriers are supported by supporting screws, which may be oscillated, in order to arrange them in various positions.

A further object of the invention is the provision of means whereby the carriers may be adjusted vertically, in order to change the direction of movement of the files.

A further object of the invention is the production of means whereby the adjusting means for the carriers may be adjusted laterally and transversely of the frame of the apparatus.

In the drawings, however, only one form of the invention is disclosed, but in practical fields this form may require slight alterations, to which the applicant is entitled, provided the alterations are comprehended by the scope of the protection.

Other features and combinations of parts will be hereinafter disclosed, shown in the drawings, and claimed.

In the drawings:—Figure 1 is a side elevation of the apparatus embodying the features of the invention. Fig. 2 is a top plan view of the apparatus. Fig. 3 is a transverse sectional view disclosing clearly the structures of the laterally and vertically movable connections between the carriers for the file bars and their vertical adjusting means. Fig. 4 is a detail perspective view of a portion of one of the file holding bars. Fig. 5 is an enlarged detail sectional view of one of the boxings 30 as illustrated in Fig. 3, but taken at right angles to the frame as shown in Fig. 3, and Fig. 6 is a sectional view on line 6—6 of Fig. 4.

In regard to the drawings, 1 represents a frame work, elongated in contour and rectangular in plan view; said frame work comprises two sections, a forward section 2 and a rear section 3, joined together. The wing nuts 5 are threaded upon the ends of the transversely disposed rod 6, there being integral collars 7 upon the rod, between which and the wing nuts the portions of the two sections are clamped to rigidly secure the sections 2 and 3 together. This frame work at one end is provided with upwardly projecting bearing members 8, while the other end of the frame, that is to say, the forward section 2, is provided with hooking devices 9, adapted to engage over the mandrel of the gin saws 10, in order to arrange the files in close position to the teeth of the saws, whereby they may be sharpened readily.

In bearings of the members 8 shafts 11 and 12 are journaled, a fly or balance wheel 16' being fast thereto to assist in the operation of the machine. On the shaft 12 a spur gear 13 is mounted and also a crank and handle 14. Upon the shaft 11 a pinion 15 is fixed to rotate therewith. This pinion 15 is in mesh with the teeth of the spur gear. When motion is imparted to the spur gear, the shaft 11 will be rotated by virtue of the pinion. The shaft 11 has formed integral therewith intermediate of its ends a crank 16, the purpose of which will hereinafter appear. The side beams of the rear section 3 of the frame of the apparatus have connected to them the upwardly projecting ends 18 of the U-shaped frame 19, shown in Fig. 3. Penetrating a horizontal bar of a portion of the U-shaped frame are the supporting screws 20, there being nuts 21 threaded upon these screws, upon opposite sides of the horizontal bar, whereby the screws 20 may be held in their adjusted positions. By this structure the transversely arranged shaft 21$^a$ may be moved vertically. This shaft 21$^a$ is mounted in bearings of the supporting screws 20, shown clearly in Fig. 3.

The rod 21$^a$ adjacent its ends is provided with threads 22, with which the nuts 23 and 24 engage. The nuts 23 and 24 are provided with sleeves 25. These sleeves 25 penetrate eyes of the supporting screws 26, and serve as supports for the same. Lock nuts 27 are also threaded upon the rod 21$^a$, in order to hold the nuts 23 and 24 in their adjusted positions. By providing the nut 24 with a sleeve, the supporting screws 26 may be oscillated in order to change their positions. Upon the supporting screws 26 sleeved nuts 29 are threaded. Mounted upon the sleeves of these nuts are the boxings 30, to which the carriers 31 (which receive and carry the file holding bars 32) are bolted by means of the countersunk bolts 33. To hold these boxings in their adjusted positions, nuts 34 are provided, which engage the threads of the supporting screws 26 above the boxings. Lock nuts 35 are designed to bind against the nuts 34 in order to hold the various parts in their adjusted positions. The boxings 30 on one of their faces are provided with ears 36, between which the ends 37 of the pitman rods 38 are arranged. The rods 38 are connected adjustably to the ears 36, to permit of the proper adjustment of the boxings 30 upon the screws 26, and the necessary lengthening or shortening of the rods 38 due to the relation of the boxings to the screws 26.

The rods 38 have their ends 39' threaded. These threaded ends are passed through apertures or portions of the beams 8, and upon the sides of these portions nuts 41 are arranged, whereby the rods 38 may be held in their adjusted positions. By adjusting one or the other of the rods 38, one or the other of the supporting screws 26 may be inclined forwardly or rearwardly, as shown in Fig. 1.

Pivotally connected to the file holding bars 31 and 32, are the connecting rods 43, the ends 44 of which are connected to the bar 45, by means of the coupling plate 46. This coupling plate is held rigidly with regard to the bar 45, as shown at 47. Slots 48 are formed in the broad sides of this coupling plate, through which the bolts 49 are passed. Pivotally mounted upon the bolts 49 are the ends 44 of the connecting rods 43, there being suitable wing-nuts 50 applied to the bolts 49, whereby the ends 44 of the connecting rods may be held with sufficient rigidity to prevent their displacement. The bar 45 is pivotally connected to the crank 16 of the shaft 11.

The file holding bars 32 are provided with offset extremities 51, through which the ends of the files 52 extend. The rear ends of the files are supported by the bracket plates 53. The bracket plates 53 are provided with screws 55 whereby the bracket plates may be held securely in their adjusted positions. The file holding bars are so arranged as to cross one another and between the ends of the files, beyond their closing point, a gin saw is arranged in order that the teeth thereof may be readily sharpened. The forward portions of the file holding bars engage a bearing and file guiding roller 56, which rotates backward and forward as motion is imparted to the bars.

To sharpen the teeth of saws, the operator manipulates the handle and crank of the shaft 12, thus imparting motion to said shaft, which in turn imparts motion to the shaft 11, by virtue of the pinion 15 and the spur gear 13. When the shaft 11 is thus rotated, the file holding bars are reciprocated through their carriers and by so doing, the teeth of the gin saw are sharpened by the files. It will be understood that this apparatus is comparatively small and can be moved from one saw to another, the hooking devices 9 being arranged over the mandrel of the saws, in order to support the machine. These hooking devices may be adjusted by means of the bolts 60, which may pass through one or another of the plurality of apertures 61. By adjusting the hooking devices, the positions of the files may be changed.

In order to cause the files to closely engage the gin saw, the rods 43 are made of resilient steel, in order that they will bear resiliently against the saw-teeth, as will be apparent on an examination of Fig. 2.

The invention having been set forth, what is claimed as new and useful is:—

1. In an apparatus for sharpening gin saws, file holding bars, carriers therefor in which the bars reciprocate, a shaft extending transversely of the apparatus, members pivoted adjustably on the shaft and connected to the carriers, means for holding the members in their adjusted positions on the transversely disposed shaft, means for permitting the connection between the members and the carriers to be adjusted, means for imparting reciprocating motions to the file holding bars, and a guiding and anti-frictional bearing roller for the file carrying ends of the bar.

2. In an apparatus for sharpening gin saws, file holding bars, carriers therefor in which the bars reciprocate, a shaft extending transversely of the apparatus, members pivoted adjustably on the shaft and connected to the carriers, means for holding the members in their adjusted positions on the transversely disposed shaft, means for permitting the connection between the members and the carriers to be adjusted, and means for imparting reciprocating motions to the file holding bars, said means comprising pitman rods, a bar connected thereto, means for adjusting the connection between the bar and the pitman rods, and a bearing and guiding roller for the ends of the file holding bars.

In testimony that I claim the foregoing as my own, I have hereto affixed my signature in the presence of two witnesses.

JAMES HENRY WESSON.

Witnesses:
THOMAS VENTRESS,
SIDNEY GLENN.